United States Patent
Tanaka et al.

(10) Patent No.: US 9,899,673 B2
(45) Date of Patent: Feb. 20, 2018

(54) NEGATIVE ELECTRODE MATERIAL, NEGATIVE ELECTRODE FOR LITHIUM ION SECONDARY BATTERY, LITHIUM ION SECONDARY BATTERY, AND METHOD OF MANUFACTURING THE SAME

(71) Applicant: Hitachi, Ltd., Chiyoda-ku, Tokyo (JP)

(72) Inventors: Naokage Tanaka, Tokyo (JP); Kento Hoshi, Tokyo (JP); Shuichi Suzuki, Tokyo (JP); Hiroshi Haruna, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/311,220

(22) PCT Filed: May 19, 2014

(86) PCT No.: PCT/JP2014/063147
§ 371 (c)(1),
(2) Date: Nov. 15, 2016

(87) PCT Pub. No.: WO2015/177830
PCT Pub. Date: Nov. 26, 2015

(65) Prior Publication Data
US 2017/0104211 A1    Apr. 13, 2017

(51) Int. Cl.
*H01M 4/36* (2006.01)
*H01M 10/0525* (2010.01)
(Continued)

(52) U.S. Cl.
CPC ........... *H01M 4/366* (2013.01); *H01M 4/483* (2013.01); *H01M 4/523* (2013.01); *H01M 4/587* (2013.01);
(Continued)

(58) Field of Classification Search
CPC ...... H01M 4/366; H01M 4/483; H01M 4/523; H01M 4/587; H01M 10/0525; H01M 2004/027; H01M 2004/021
See application file for complete search history.

(56) References Cited

U.S. PATENT DOCUMENTS

2009/0004564 A1   1/2009   Ishida et al.
2011/0244333 A1   10/2011  Kawada
(Continued)

FOREIGN PATENT DOCUMENTS

EP    2 717 359 A1     4/2014
JP    2009-277485 A    11/2009
(Continued)

OTHER PUBLICATIONS

International Search Report (PCT/ISA/210) issued in PCT Application No. PCT/JP2014/063147 dated Jul. 8, 2014 with English translation (9 pages).
(Continued)

*Primary Examiner* — Laura Weiner
(74) *Attorney, Agent, or Firm* — Crowell & Moring LLP (57) ABSTRACT

The invention addresses the problem of providing a lithium ion secondary battery excellent in initial charge-discharge characteristics and life characteristics. To solve the above problem, the invention provides a lithium ion secondary battery in which an electrode group having a positive electrode and a negative electrode is housed in a battery can, wherein the negative electrode includes a negative electrode active material supported on a negative electrode foil, and the negative electrode active material includes cores having SiO as a main component, a composite oxide coating layer of Fe and $SiO_2$ disposed on the periphery of each of the cores, and a carbon coating layer disposed on the periphery of the composite oxide coating layer of Fe and $SiO_2$.

2 Claims, 7 Drawing Sheets

(51) Int. Cl.
*H01M 4/48* (2010.01)
*H01M 4/52* (2010.01)
*H01M 4/587* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2012/0003529 A1 | 1/2012 | Yamakaji | |
| 2013/0157127 A1 | 6/2013 | Hirose et al. | |
| 2014/0110639 A1* | 4/2014 | Yamamura | H01M 4/366 429/218.1 |
| 2015/0099174 A1* | 4/2015 | Ren | H01M 4/366 429/218.1 |

FOREIGN PATENT DOCUMENTS

| | | |
|---|---|---|
| JP | 2011-222151 A | 11/2011 |
| JP | 2012-33478 A | 2/2012 |
| JP | 2012-134050 A | 7/2012 |
| JP | 2013-131324 A | 7/2013 |
| WO | WO 2012/176039 A1 | 12/2012 |
| WO | WO 2013/038884 A1 | 3/2013 |

OTHER PUBLICATIONS

Extended European Search Report issued in counterpart European Application No. 14892859.1 dated Sep. 8, 2017 (Seven (7) pages).

* cited by examiner

| | AVERAGE PARTICLE DIAMETER (μm) | TRANSITION METAL SOURCE | MASS RATIO OF Fe (WHEN SiO IS 100) | CARBON COATING | PROCESSING ATMOSPHERE | PROCESSING TEMPERATURE (°C) |
|---|---|---|---|---|---|---|
| EXAMPLE 1 | 5 | Fe2O3 | 20 | PRESENCE | ARGON | 800 |
| EXAMPLE 2 | 5 | IRON CITRATE (III) | 20 | PRESENCE | ARGON | 800 |
| EXAMPLE 3 | 5 | Fe2O3 | 20 | PRESENCE | ARGON | 800 |
| EXAMPLE 4 | 5 | IRON CITRATE (III) | 20 | PRESENCE | ARGON | 800 |
| COMPARATIVE EXAMPLE 1 | 5 | ABSENCE | ABSENCE | ABSENCE | ARGON | 800 |
| COMPARATIVE EXAMPLE 2 | 5 | ABSENCE | ABSENCE | PRESENCE | ARGON | 800 |
| COMPARATIVE EXAMPLE 3 | 5 | Fe2O3 | 20 | ABSENCE | AIR | 800 |
| COMPARATIVE EXAMPLE 4 | 5 | IRON CITRATE (III) | 20 | ABSENCE | AIR | 800 |
| COMPARATIVE EXAMPLE 5 | 5 | Fe2O3 | 20 | PRESENCE | ARGON | 800 |
| COMPARATIVE EXAMPLE 6 | 5 | IRON CITRATE (III) | 20 | PRESENCE | ARGON | 800 |

FIG. 8

| | INITIAL COULOMBIC EFFICIENCY (%) (AT 2.5V) | INITIAL COULOMBIC EFFICIENCY (%) (AT 1.5V) | CAPACITY RETENTION RATE (%) AT 15-TH CYCLE (AT 1.5V) | CAPACITY RETENTION RATE (%) AT 30-TH CYCLE (AT 1.5V) | INITIAL DISCHARGE CAPACITY mAh (AT 1.5V) | DISCHARGE CAPACITY mAh AT 30-TH CYCLE (AT 1.5V) |
|---|---|---|---|---|---|---|
| EXAMPLE 1 | 74 | 56 | 86 | 77 | 770 | 593 |
| EXAMPLE 2 | 69 | 64 | 87 | 67 | 1210 | 811 |
| EXAMPLE 3 | 78 | 58 | 93 | 87 | 670 | 583 |
| EXAMPLE 4 | 77 | 74 | 92 | 87 | 1100 | 957 |
| COMPARATIVE EXAMPLE 1 | 60 | 54 | 51 | 36 | 1560 | 562 |
| COMPARATIVE EXAMPLE 2 | 76 | 74 | 66 | 47 | 1307 | 614 |
| COMPARATIVE EXAMPLE 3 | 52 | 33 | 105 | 110 | 300 | 330 |
| COMPARATIVE EXAMPLE 4 | 45 | 33 | 105 | 110 | 167 | 184 |
| COMPARATIVE EXAMPLE 5 | 68 | 54 | 66 | 56 | 624 | 349 |
| COMPARATIVE EXAMPLE 6 | 68 | 53 | 65 | 54 | 612 | 331 |

NEGATIVE ELECTRODE MATERIAL, NEGATIVE ELECTRODE FOR LITHIUM ION SECONDARY BATTERY, LITHIUM ION SECONDARY BATTERY, AND METHOD OF MANUFACTURING THE SAME

TECHNICAL FIELD

The present invention relates to a negative electrode material, a negative electrode for a lithium ion secondary battery, a lithium ion secondary battery, and a method of manufacturing the same.

BACKGROUND ART

In recent years, development of a lithium ion secondary battery has been actively advanced. Graphite is typically used for a negative electrode active material for the lithium ion secondary battery. However, further increase in capacity has recently been required for the lithium ion secondary battery with the increase of cruising distance of electric vehicles and multifunctionality of mobile terminals.

To this end, as a method to increase capacity of the lithium ion secondary battery, increase in capacity of a negative electrode active material, that is, a high capacity negative electrode of a metal series exemplified by Si series and Sn series has been examined. However, such a material exhibits large volume change accompanying charge and discharge, unfortunately causing crack of active material or drop off of the active material from a current corrector to deteriorate cycle characteristics.

PTL 1 has proposed SiO in which nanosized Si is dispersed in $SiO_2$ to solve the above problems. This SiO indicates cycle characteristics better than those of Si.

CITATION LIST

Patent Literature

PTL 1: JP 2011-222151 A

SUMMARY OF INVENTION

Technical Problem

However, SiO disclosed in PTL 1 includes a number of dangling bonds in crystal, so that Li ions are trapped during charge to produce Li silicate, disadvantageously causing irreversible capacity. This results in high electric resistance, disadvantageously lowering characteristics in the case of a high charge-discharge rate and disadvantageously making electrolytic solution be readily consumed on the surface of the active material. To cope with such disadvantages, an effective method has been developed to the above problems by coating the surface of SiO with carbon to improve conductivity, or by adding VC or EFC to electrolytic solution. However, there is still scope for improvement. For example, volume expansion rate during charging and discharging is largely different between Sip and the carbon layer of the surface, so that the carbon layer of the surface is disadvantageously peeled off to make the surface of SiO be exposed to electrolytic solution during repetition of the cycle.

The invention solves such disadvantages and problems. The writer et al. have made intensive studies and as a result, found that cycle characteristics are improved while irreversible capacity is reduced by forming an oxide layer that forms a compound with $SiO_2$ on the surface of SiO, and by making fine metal having a high affinity with carbon be deposited. That is, the invention provides a lithium ion secondary battery excellent in initial charge-discharge characteristics and life characteristics.

Solution to Problem

To solve the above problems, the invention provides a lithium ion secondary battery in which an electrode group having a positive electrode and a negative electrode is housed in a battery can, wherein the negative electrode includes a negative electrode active material supported on a negative electrode foil, and the negative electrode active material includes cores 30 having SiO as a main component, a composite oxide coating layer 31 of Fe and $SiO_2$ disposed on a periphery of each of the cores 30, and a carbon coating layer 32 disposed on a periphery of the composite oxide coating layer of Fe and $SiO_2$.

Advantageous Effects of Invention

The invention makes it possible to achieve initial charge-discharge characteristics without lowering other battery characteristics. The problems, structures, and effects other than those described above will be apparent with explanations of the following embodiment.

DESCRIPTION OF EMBODIMENTS

Hereinafter, with reference to the drawings, an embodiment of the invention will be described. Descriptions below illustrate specific examples of the details of the invention, and the invention is not limited to these descriptions. Various alternations and modifications by those skilled in the art are possible within the scope of the technical idea disclosed in the specification. For example, although a cylindrical lithium ion secondary battery is described as an example of a battery, the spirit of the invention can be applied to a lithium ion secondary battery using a plate-like current collector or a platelike current collector being bent such as a square type battery or a laminate type battery.

In all the diagrams for illustrating the invention, those having the same functions are denoted by the same reference signs, and redundant description of them will be omitted in some cases.

The word "step" in the specification includes not only an independent step but a step that cannot be clearly distinguished from sonic other step but can achieve an intended effect thereof.

A numerical range indicated using "to" in the specification indicates a range including numerical values described before and after to as a minimum value and a maximum value, respectively.

Battery

Figure 1:
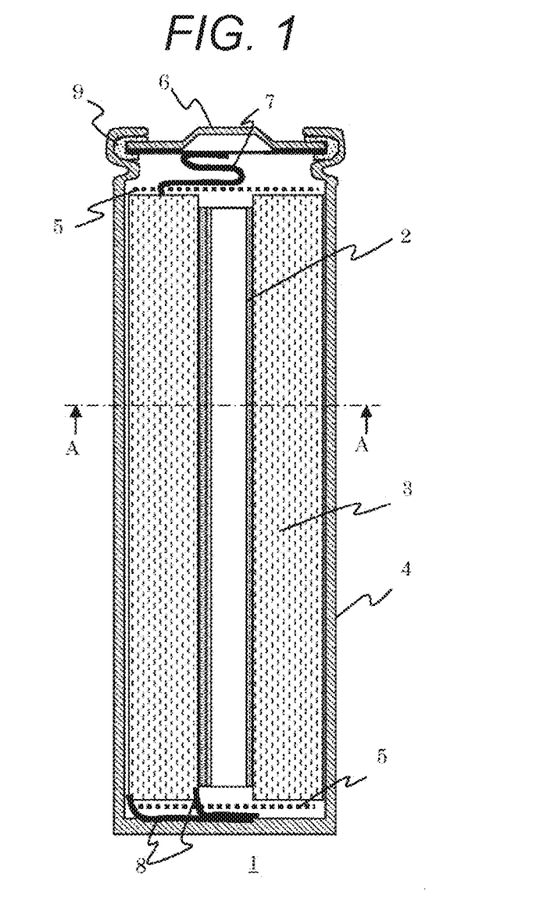
FIG. 1 is a diagram illustrating an example of a lithium ion secondary battery according to an embodiment of the invention.

First, the outline of a lithium-ion battery of the invention will be described using FIG. 1. FIG. 1 is a diagram illustrating a vertical cross section of a cylindrical battery 1 of the embodiment. The cylindrical battery 1 is made by filling electrolytic solution in a battery can 4 in which an electrode group 3 is housed, the electrode group 3 being formed by winding a positive electrode 200 and a negative electrode 300 with a separator 350 interposed therebetween to oppose to each other (see FIG. 3).

A shaft center 2 exists at a portion from which winding of the electrode group 3 starts, and the electrode group 3 is configured to be wound around the shaft center 2, and the electrode group 3 and the shaft center 2 are housed in the battery can 4. Note that the shaft center 2 may he a known one as long as the shaft center 2 can support the positive electrode 200, the separator 350, and the negative electrode 300. Furthermore, the shape of the battery can 4 may be selected from a cylindrical shape, a flat oval shape, a flat elliptic shape, and a square shape in conformity to the shape of the electrode group 3. Furthermore, the material of the battery can 4 is selected from materials having corrosion resistance to non-aqueous electrolyte such as aluminum, stainless steel, and nickel plating steel. Furthermore, when the battery can 4 is electrically connected to the positive electrode 200 or the negative electrode 300, it is preferable that the material of the battery can 4 be selected such that the material is altered in its properties due to corrosion of the battery can 4 or alloying with lithium ions.

Electric insulating plates 5 are provided at an upper end and a lower end of the electrode group 3 to prevent the electrode group 3 from contacting to the battery can 4 due to vibration, etc. to cause short circuit.

Furthermore, a conductive lead 7, which is a positive electrode, is provided at the upper end of the electrode group 3. An end of the conductive lead 7 is electrically connected to the positive electrode 200 of the electrode group 3, and the other end of the conductive lead 7 is electrically connected to a battery lid 6.

On the other hand, a conductive lead 8, which is a negative electrode, is disposed at the lower end of the electrode group An end of the conductive lead 8 is electrically connected to the negative electrode 300 of the electrode group 3, and the other end of the conductive lead 8 is joined to the bottom of the battery can 4.

Electrolytic solution is filled in the battery can 4 when atmosphere is controlled to be a dehumidified atmosphere or an inert atmosphere. Then a gasket 9 for electric insulation and gas sealing is disposed between the battery can 4 and the battery lid 6, and the battery can 4 is swaged, thereby uniting the battery can 4 and the battery lid 6 to keep the inside of the battery can 4 sealed. Note that filling method of the electrolytic solution includes, besides the above method, a method that directly adds electrolytic solution to the electrode group in a state where the battery lid 6 is opened, and a method that adds electrolytic solution from an inlet provided at the battery lid 20.

Figure 2:
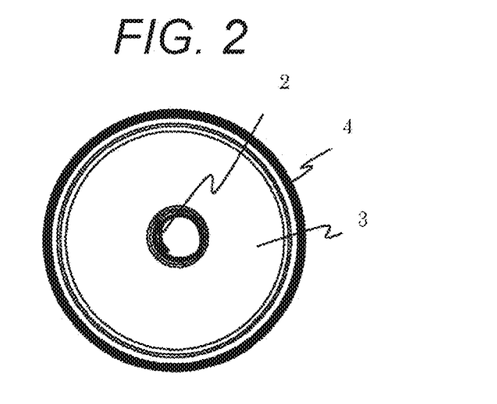
FIG. 2 is a cross sectional view taken along line A-A of FIG. 1.

FIG. 2 is a cross sectional view when the battery 1 in FIG. 1 is viewed from A-A cross section. In this manner, the shaft center 2 and the electrode group 3 are housed in the battery can 4.

Figure 3:
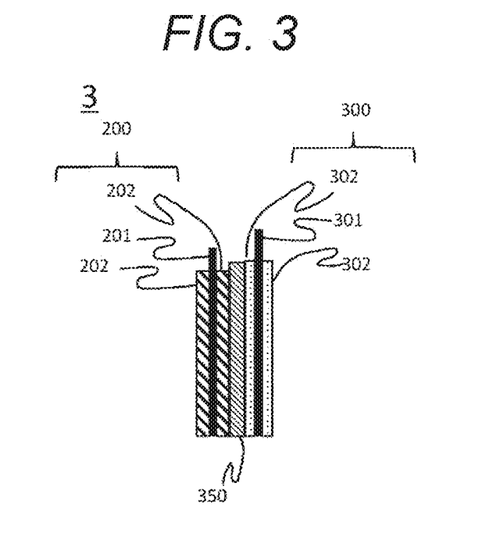
FIG. 3 is a detail view of a positive electrode 200 and a negative electrode 300 of the invention.

Next, the structure of the electrode group 3 will be described, in detail using FIG. 3. As described above, the electrode group 3 has a structure in which the positive electrode 200 and the negative electrode 300 are wound with the separator 350 interposed therebetween.

The positive electrode 200 has a structure in which positive electrode materials 202 are provided on both surfaces of a positive electrode foil 201. The negative electrode 300 has a structure in which negative electrode materials 302 are provided on both surfaces of a negative electrode foil 301. Then, the separator 350 is interposed between the positive electrode 200 and the negative electrode 300, and is wound around the shaft center 2 to complete the electrode group 3.

Furthermore, in the embodiment, a cylindrical battery is used as a specific example for description. However, the battery to which the invention can be applied is not limited to the cylindrical battery, and the invention can be applied also to a square type battery and a laminate cell battery.

Thus, besides the cylindrical shape illustrated in FIG. 2, the electrode group 3 may have various shapes in which the positive electrode 200 and the negative electrode 300 are wound to be any shape including a flat shape. Furthermore, the electrode group 3 maybe manufactured by winding the electrodes without using the shaft center 2, or may be an electrode group in which the positive electrode and the negative electrode are laminated with a separator interposed therebetween like a laminate cell battery.

Subsequently, the above elements of the battery will be described in detail.

Positive Electrode 200

The positive electrode material 202 forming the positive electrode 200 includes a positive electrode active material, a conductive agent, a binder, and a current collector. Examples of the positive electrode active material include $LiCoO_2$, $LiNiO_2$, and $LiMn_2O_4$, which are typical examples. In addition, $LiMnO_3$, $LiMn_2O_3$, $LiMnO_2$, $Li_4Mn_5O_{12}$, $LiMn_{2-x}MxO_2$ (wherein, M is at least one selected from the group consisting of Co, Ni, Fe, Cr, Zn, and Ti, X=0.01 to 0.2), $Li_2Mn_3MO_8$ (wherein, M is at least one selected from the group consisting of Fe, Co, Ni, Cu, and Zn) $Li_{1-x}A_xMn_2MO_4$ (wherein, A is at least one selected from the group consisting of Mg, B, Al, Fe, Co, Ni, Cr, Zn, and Ca, X=0.01 to 0.1), $LiNi_{1-x}M_xO_2$ (wherein, M is at least one selected from the group consisting of Co, Fe, and Ga, X=0.01 to 0.2), $LiFeO_2$ $Fe_2(SO_4)_3$, $LiCo_{1-x}M_xO_2$ (wherein, M is at least one selected from the group consisting of Ni, Fe, and Mn, x=0.01 to 0.2), (wherein, M is at least one selected, from the group consisting of Mn, Fe, Co, Al, Ga, Ca, and Mg, X=0.01 to 0.2), $Fe(MoO_4)_3$, $FeF_3$, $LiFePO_4$, $LiMnPO_4$, and so on can be enumerated.

The particle diameter of the positive electrode active material is typically regulated so as to be not more than the thickness of a mixture layer formed of the positive electrode active material, the conductive agent, and the binder. When coarse particles having a size not less than the thickness of the mixture layer exist in the powder of the positive electrode active material, it is preferable to preliminarily remove the coarse particles by sieve classification, wind flow classification, etc. to manufacture particles having a size of not more than the thickness of the mixture layer.

Furthermore, the positive electrode active material typically has a high electric resistance because of being an oxide system, a conductive agent including carbon powder to make up for electric conductivity is used. Both the positive electrode active material and the conductive agent normally are powders, making it possible to mix a binder with the powders to combine the powders to each other, and to, at the same time, adhere the powers to the current collector.

For the positive electrode foil 201 (see FIG. 3) structuring the positive electrode 200, an aluminum foil having a thickness of 10 to 100 μm, a perforated aluminum foil having a thickness of 10 to 100 μm and having a pore diameter of 0.1 to 10 mm, an expanded metal, a foamed metal plate, or the like is used. Besides aluminum, a material such as stainless or titanium can be also used. In the invention, any current collector can be used without being limited by a material, shape, manufacturing method, or the like.

The positive electrode slurry in which positive electrode active material, conductive agent, binder, and organic solvent are mixed is adhered to the current collector by a doctor blade method, a dipping method, a spray method, or the like, and thereafter the organic solvent is dried and pressure forming is performed by roll pressing, whereby the positive electrode 200 can be manufactured. Alternatively, by performing a process from coating to drying multiple times, a plurality of mixture layers can also be laminated on the current corrector.

Separator 350

For the separator 350, a polyolefin polymer sheet made from polyethylene, polypropylene, or the like, a two-layered structure in which a polyolefin polymer and a fluorine polymer sheet exemplified by tetrafluoropolyethylene are welded, or the like can be used. A mixture of ceramic and binder may be formed in a thin layer on the surface of the separator to prevent the separator from contracting when the battery temperature increases. These separators need to pass lithium ions through them during discharging and charging of the battery, so that these separators typically can be used in the lithium ion battery as long as its micropore diameter is 0.01 to 10 μm and its porosity is 20 to 90%.

Electrolytic Solution

Typical examples of the electrolytic solution capable of being used in the embodiment of the invention include a solution in which lithium hexafluorophosphate ($LiPF_6$), or lithium borofluoride ($LiBF_4$) is dissolved as an electrolyte in a solvent in which dimethyl carbonate, diethyl carbonate, ethyl methyl carbonate, or the like is mixed with ethylene carbonate. The invention is capable of using other electrolytic solutions without being limited by the type of the solvent and the electrolyte, and the mixture ratio of the solvent.

Examples of non-aqueous solvents that can be used for the electrolytic solution include non-aqueous solvents such as propylene carbonate, ethylene carbonate, butylene carbonate, vinylene carbonate, γ-butyrolactone, dimethyl carbonate, diethyl carbonate, methyl ethyl carbonate, 1,2-dimethoxyethane, 2-methyltetrahydrobyran, dimethyl sulfoxide, 1,3-dioxolane, formamide, dimethyl formamide, methyl propionate, ethyl prcpancate, phosphate triester, trimethoxymethane, dioxolan, diethyl ether, sulfolane, 3-methyl-2-oxazolidinone, tetrahydrofuran, 1,2-diethoxyethane, chloroethylene carbonate, or chloroprcpylene carbonate. Other solvents other than the above solvents may be used as long as the other solvents are not dissolved on the positive electrode 200 or the negative electrode 300 embedded in the battery 1 of the invention.

Examples of the electrolyte include various kinds of lithium salts such as $LiPF_6$, $LiBE_4$, $LiClO_4$, $LiCF_3SO_3$, $LiCF_3CO_2$, $LiAsF_6$, $LiSbF_6$, and imide salt of lithium exemplified by lithium trifluoromethanesulfonimide. A non-aqueous electrolytic solution made by dissolving one of the salts in the above solvent can be used as an electrolytic solution for the battery. Other electrolytes may be used as long as they do not decompose on the positive electrode 200 or the negative electrode 300 embedded in the battery 1 of the invention.

When a solid polymer electrolyte (polymer electrolyte) is used, an ion-conducting polymer such as polyethylene oxide, polyacrylonitrile, polyvinylidene fluoride, polymethylmethacrylate, polyhexafluoropropylene, or polyethylene oxide can be used for the electrolyte. Using such a solid polymer electrolyte advantageously makes it possible to omit the separator 350.

Furthermore, ionic liquid can be used. For example, a combination that do not decompose on the positive electrode and the negative electrode can be selected from EMI-BF4 (1-ethyl-3-methylimidazolium tetrafluoroborate) a mixed complex of lithium salt LiN $(SO_2CF_3)_2$ (LiTFSI) triglyme, and tetraglyme, cyclic quaternary ammonium series positive ion (N-methyl-N-propylpyrrolidinium is exemplified), and imide series negative ion (bis (fluorosulfonyl) imide is exemplified) to be used in the battery according to the embodiment.

The structure of the lithium ion secondary battery in the embodiment of the invention is not particularly limited, but generally is a structure in which a positive electrode, a negative electrode, and separators provided as necessary are wound in a flat scroll shape to be a wounded polar plate group or formed in flat plates and laminated to be a laminate polar plate group, and the polar plate group is encapsulated in an outer packaging body.

Negative Electrode 300

For the negative electrode material 302 (see FIG. 3) structuring the negative electrode 300, a negative electrode active material is used that is particles in which 810 is coated with a composite oxide of Fe and SiO2 or a complex formed of Fe and a composite oxide of Fe and SiO2 and is further coated with a carbonaceous material.

Figure 4:
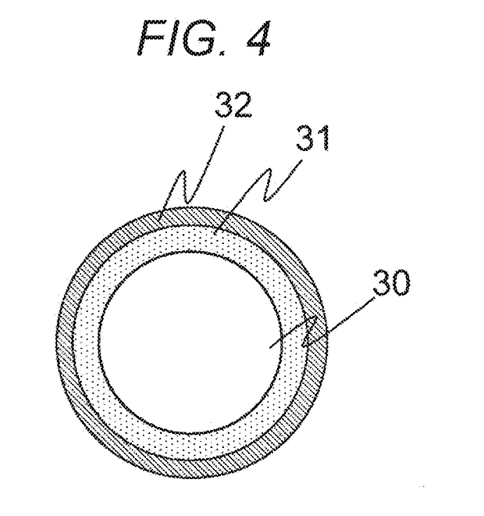
FIG. 4 is a detail view of a negative electrode active material particle of the invention.

FIG. 4 is a diagram illustrating the negative electrode active material according to the invention. The negative electrode active material is formed of a core 30, a coating layer 31 that is a composite oxide of Fe and SiO2 or a complex formed of metal Fe and a composite oxide of Fe and SiO2, the coating layer 31 existing on the outer periphery of the core 30, and a carbon coating layer 32 that is a composite oxide of Fe and SiO2 or a complex formed of metal Fe and a composite oxide of Fe and SiO2, the carbon coating layer 32 existing on the outer periphery of the coating layer 31. The core 30 is a core having SiO as its main component, the coating layer 31 that is a composite oxide of Fe and SiO2 or a complex formed of metal Fe and a composite oxide of Fe and SiO2 is a layer having Fe and a composite oxide of Fe and SiO2 as its main components, and the carbon coating layer 32 is a layer having carbon as its main component as its name suggests.

The composite oxide coating layer 31 allows the peak belonging to Fe, Fe2SiO4, or FeSiO3 to be observed in an XRD measurement.

Method of Forming Coating

Herein, the process for forming the composite oxide coating layer 31 formed of Fe and SiO2 on the outer periphery of the cores 30 will be described. As a method of coating the composite oxide of Si—Fe on SiO, it is desirable that an Fe containing compound having a particle diameter smaller than that of SiO is mixed by a mortar or the like and the mixture is made to be fired at about 600° C. to 1100° C. under an inert atmosphere. The reason of using Fe having a particle diameter smaller than that of SiO is to uniformly distribute the precursor of Fe on the periphery of SiO. Using Fe having a particle diameter larger than that of SiO can cause Fe and its oxide to be unevenly distributed. The uneven distribution of Fe causes bias in expansion/contraction behavior of active material in the electrode, making the conducting network of the electrode be readily broken. Thus, the invention forms coating of Fe by using Fe having a particle diameter smaller than that of SiO to suppress breakage of the conducting network of the electrode.

Note that as a solid Fe containing compound, an organic compound such as metal alkoxide or metallo-organic complex can also be used besides an inorganic compound such as metallic oxide, hydroxide, carbonate, or nitrate.

Furthermore, some of Fe oxide is thermally decomposed when fired. At the time, reaction of Fe oxide and the surface of SiO forms a composite oxide of Si and Fe oxide. Formation of the layer makes the surface made from SiO particles (surface of the core 30) react with the composite oxide, terminating dangling-bonds of the surface made from SiO Particles. This suppresses Li-ions from being trapped by the dangling-bonds, reducing irreversible capacity.

Furthermore, strong combination of Si—O—Fe (metal) is formed, making the coating film less likely to peel off. Consequently, even when particles expand due to charge and discharge, the coating layer 31 of composite oxide becomes less likely to peel off from the core 30, suppressing exposure of the surface of SiO. In addition, dangling-bonds of the surface of Si and SiO Particles (surface of the core 30) are terminated by metal element. This suppresses Li-ions from being trapped by the dangling-bonds, reducing irreversible capacity.

Furthermore, as described below, a carbon material is to be further coated on the periphery on SiO particles coated with the composite oxide coating layer 31 formed herein. A large difference exists in volume change accompanying discharge and charge between SiO and carbon to be coated on the surface (SiO: 200%, amorphous carbon: 2 to 4%), so that the carbon layer on the surface is unfortunately ruptured or peeled off when charge and discharge are repeated. Providing the composite oxide coating layer 31 formed of Fe and SiO2 having a volume change smaller than that of SiO between carbon and SiO makes it possible to suppress breakage of coating carbon layer due to volume change of SiO.

As described above, it is preferable that firing temperature be 600° C. to 1300° C. When the firing temperature is higher than 1300° C., growth of Si particles advances in SiO particles but crystallization of SiO2 disadvantageously advances on the other hand, lowering charge-discharge capacity and cycle characteristics.

Furthermore, when the firing temperature is lower than 600° C., reaction between Fe and SiO2 fails to occur, failing to form a good coating film.

Furthermore, at is desirable that the coating amount of the composite oxide coating layer 31 be not more than 50% in Fe/Si that is the ratio between the mass of Fe and the mass of Si, and the thickness of the composite oxide coating film be 5 nm to not more than 1 μm. Furthermore, it is more preferable that Fe/Si be not more than 20% and the thickness be 20 nm to not more than 500 nm.

When the composite oxide coating layer 31 is too thick, Li becomes less likely to reach SiO of the inside, that is, discharge and charge become difficult to occur. Furthermore, affection due to the composite oxide layer is reduced. For example, weight ratio of SiO is relatively reduced. This makes it possible to prevent the capacity of the battery from being lowered and to prevent the separation potential of Li from the composite oxide from becoming higher than the release potential of Li from SiO.

Method of Forming Carbon Coating

A liquid or gaseous organic compound can be used for the coating carbon material in an example of the embodiment.

First, when a gaseous organic compound, for example, a hydrocarbon gas such as methane, ethane, or benzene is used, complex particles may be subjected to carbonaceous coating by heat decomposition (600 to 1300° C.)

When the temperature is considerably lower than 600° C., crystallinity of coated carbon is lowered, increasing electric resistance and irreversible capacity and lowering adhesiveness with the complex particles. In contrast, when the temperature is considerably higher than 1300° C., crystallinity and reactivity of carbon improve, causing reaction (reaction in which oxide of Fe is reduced to disadvantageously form metallic phase of Fe) in the complex particles, which is not preferable. In addition, as described above, growth of Si particles and crystallization of SiO2 are facilitated, resulting in deterioration of cycle characteristics, which is not preferable.

Furthermore, when a liquid organic compound, for example, aqueous solution of water-soluble organic matter such as carboxymethylcellulose (CMC) carboxyethylcellulose, alginic acid, polyacrylic acid, or urinary acid is used, the composite oxide may be subjected to carbonaceous coating by being subjecting to firing at 600° C. to 1300° C. under an inert gas atmosphere after the composite oxide is impregnated in or mixed with the aqueous solution and dried.

When heat treatment is further performed, another carbon precursor may be contained, and a polymer such as a phenolic resin or a polystyrene, a solid body that can be carbonized such as pitch, or the like can be processed in solid state as it is or after made to be a melt. When using a melt, it is preferable to keep the temperature at about 200° C. for a constant time, make the solvent vaporize, and thereafter increase the temperature to a target temperature.

The above method makes it possible to coat a carbon material on the particles in which a composite oxide of Fe and SiO2 is coated on SiO. Further coating of carbon on SiO coated with a composite oxide of Fe and SiO2 makes it possible to give the complex particles higher conductivity. Consequently, it is expected that charge and discharge become possible even when a relatively large current is flown, and that sintering of coated oxide parts with each other is suppressed.

Hereinafter, specific examples of the invention will be described.

EXAMPLE 1

To SiO adjusted to have an average particle diameter of 5 μm, $Fe_2O_3$ powder having an average particle diameter of 0.3 μm was mixed such that the mass ratio becomes Si:Fe=80:20, and was kneaded by an automatic mortar for 30 min.

The mixed powder was compressed to be a pellet shape, and the temperature was increased to 800° C. at a rate of temperature increase of 50° C./h in an atmosphere kiln under an inert gas atmosphere (Ar atmosphere), and was subjected to heat treatment at 800° C. for 2 h.

Then, ammonium alginate aqueous solution was added to the resultant powder and dried, and then was subjected to heat treatment for heating at 800° C. to 1100° C. for carbonaceous coating.

After the heat treatment, natural cooling was performed, yielding complex particles in which carbonaceous material is coated on SiO coated with a composite oxide of Fe and SiO2. The resultant complex particles were coarsely crushed by a mill (TM837 manufactured by Tescom Co., Ltd), and then crushed such that the average particle diameter became not more than 10 μm by a grinder (Ishikawa-type agitating grinder (registered trademark) AGA model). The crushed powder, carboxymethylcellulose (CMC), and vapor grown carbon fiber (VGCF) were weighted to be 75:15:10 in solid content ratio, and sufficiently dispersed by the mortar, and thereafter pure water was added by an adequate amount for viscosity control to manufacture a slurry.

The manufactured slurry was applied on an electrolytic copper foil having a thickness of 10 μm to be 2 mg/cm2 using an applicator, and left to stand for 1 h in an 80° C. stationary dryer to remove moisture. Pressing was performed so that the electrode density became 1.3 g/cc by a roll press.

The pressed electrode was subjected to vacuum drying at 120° C. for 2 h and stamped to make a circle shape electrode having a diameter of 15 mm as a test electrode. The model cell illustrated in the drawing was manufactured using the test electrode.

The electrolytic solution was used in which LiPF6 of 1 M was dissolved and in which weight percent ratio of ethylene carbonate (EC):ethyl methyl carbonate (EMC):dimethyl carbonate (DMC) was adjusted to be 2:4:4.

EXAMPLE 2

Example 2 is similar to Example 1 except that citric acid Fe (III) was used instead of FE2O3 powder used in Example 1.

EXAMPLE 3

Example 3 is different from Example in that carboxymethylcellulose_ammonium salt was used instead of alginic acid ammonium.

First, carboxymethylcellulose_ammonium salt (CMC_NH4) and purified water was mixed to manufacture 5% CMC_NH4, and the CMC_NH4 aqueous solution was added to SiO particles coated with the composite oxide of Fe and SiO2 manufactured in Example 1 in a sequential order in three separate rounds to coat the composite oxide of Fe and S102 such that mass percent ratio of SiO:CMC_NH4 became 100:50.

Each time CMC_NH4 aqueous solution was added, mixture was performed for 0.2 h at a speed of 15 rpm using a planetary blender (HIVIS MIX (registered trademark) Model 2P-03 manufactured by PRIMIX Co., Ltd.).

Moisture was removed from the mixture by an 80° C. stationary dryer, and the dried mixture was subjected to vacuum drying at 100° C. for 2 h. The dried mixture was increased in temperature to 800° C. at the rate of temperature increase of 50° C./h and subjected to heat treatment for 2 h at 800° C. in an atmosphere kiln under Ar atmosphere.

After the heat treatment, natural cooling was performed, yielding complex particles in which carbonaceous material is coated on SiO coated with a composite oxide of Fe and SiO2. The resultant complex particles were coarsely crushed by a mill (TM837 manufactured by Tescom Co., Ltd), and then crushed such that the average particle diameter became not more than 10 μm by a grinder (Ishikawa-type agitating grinder (registered trademark) AGA model). The crushed powder, carboxymethylcellulose (CMC), and vapor grown carbon fiber (VGCF) were weighted to be 75:15:10 in solid content ratio, and sufficiently dispersed by the mortar, and thereafter pure water was added by an adequate amount for viscosity control to manufacture a slurry.

The manufactured slurry was applied on an electrolytic copper foil having a thickness of 10 μm to be 2 mg/cm2 using an applicator, and left to stand for 1 h in an 80° C. stationary dryer to remove moisture. Pressing was performed so that the electrode density became 1.3 g/cc by a roll press.

The pressed electrode was subjected to vacuum drying at 120° C. for 2 h and stamped to make a circle shape electrode having a diameter of 15 mm as a test electrode. The model cell illustrated in the drawing was manufactured using the test electrode.

The electrolytic, solution was used in which LiPF6 of 1 M was dissolved and in which weight percent ratio of ethylene carbonate (EC):ethyl methyl carbonate (EMC):dimethyl carbonate (DMC) was adjusted to be 2:4:4.

In charging conditions, constant current charge was performed up to 0.01 V at the current value corresponding to 0.2 C, and thereafter constant voltage charge was performed till the current value became 1/100 C. Then, after the interruption of 5 min, discharge was performed at the current value corresponding to 0.2 C to 2.5 V. This cycle shall be one cycle.

EXAMPLE 4

The model cell was manufactured by the procedure similar to that in Example 3 except that the powder used in Example 2 was used instead of SiO powder coated with iron oxide (Example 1) used in Example 3.

COMPARATIVE EXAMPLE 1

Comparative Example 1 is similar to Example 1 except that heat treatment was performed without mixing anything with SiO.

COMPARATIVE EXAMPLE 2

The model cell was manufactured by the procedure similar to that in Example 3 except that SiO used in Comparative Example 1 was used instead of SiO coated with iron oxide in Example 3.

COMPARATIVE EXAMPLE 3

Comparative Example 3 is similar to Example 1 except that mix powder of SiO and Fe2O3 was fired in air in Example 1.

COMPARATIVE EXAMPLE 4

Comparative Example 4 is similar to Example 2 except that the mix powder of SiO and citric acid (III) was fired in air in Example 2.

COMPARATIVE EXAMPLE 5

The model cell was manufactured by the procedure similar to that in Example 3 except that the complex particles manufactured in Comparative Example 3 were used alternatively in Example 3.

COMPARATIVE EXAMPLE 6

The model cell was manufactured by the procedure similar to that in Example 3 except that the complex particles manufactured in Comparative Example 4 were used alternatively in Example 4.

Figure 7:
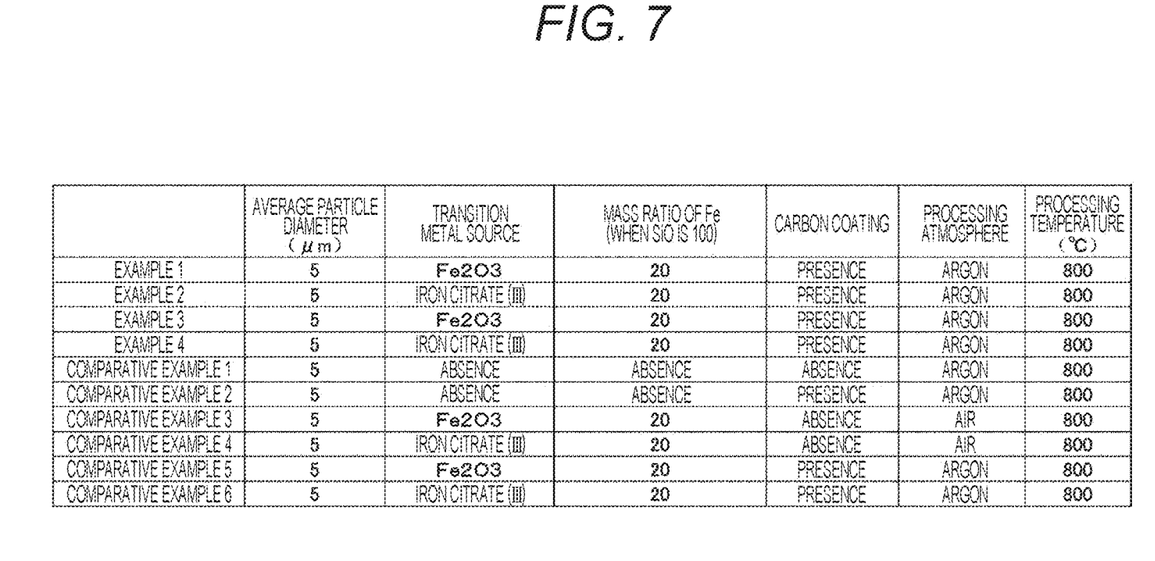
FIG. 7 is a diagram illustrating manufacturing conditions of a negative electrode active material in each of the examples and the comparative examples.

Not that, FIG. 7 illustrates, for easy understanding, the summary of manufacturing conditions in the Examples and Comparative Examples.

Figure 5:
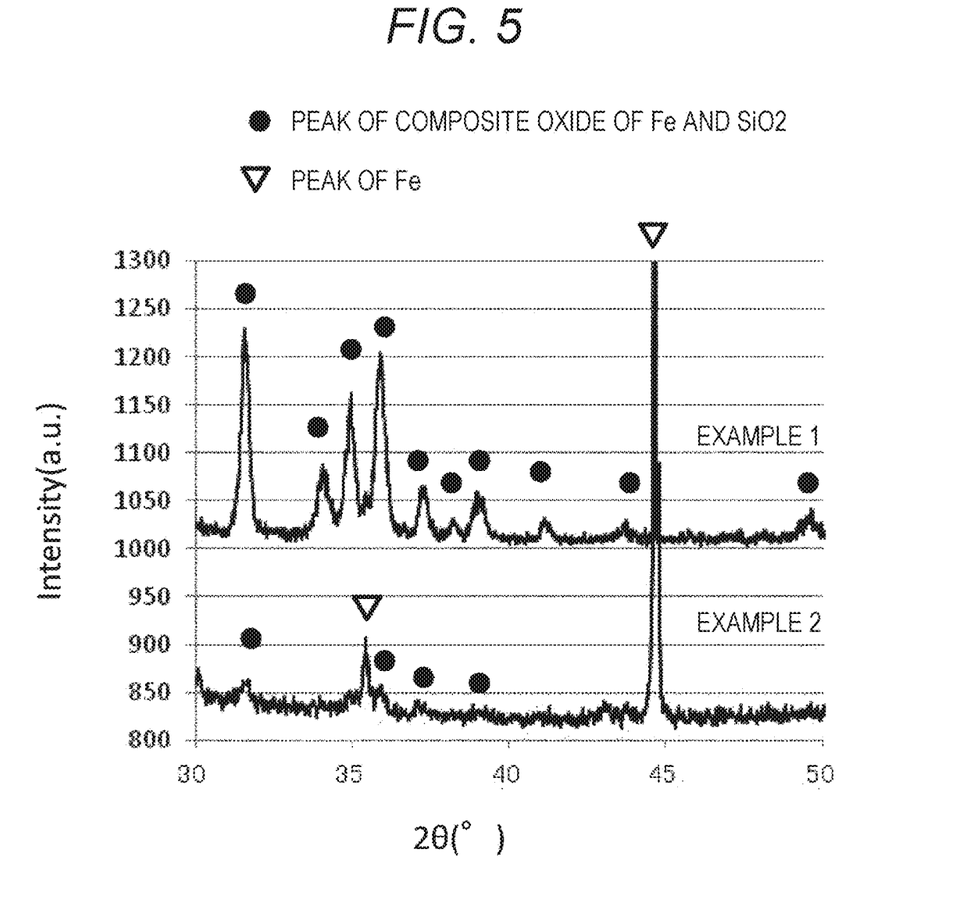
FIG. 5 illustrates XRD measurement results of negative electrode active material particles of Example 1 and Example 2 of the invention.

FIG. 5 illustrates XRD measurement results of Example 1 and Example 2. Black circle in FIG. 5 is a peak indicating composite oxide of Fe and SiO2, and white triangle illustrates a peak of Fe. In Example 1, peaks of composite oxide of SiO2 and Fe appear, and in Example 2, a peak of Fe and weak peaks of composite oxide of SiO2 and Fe appear. These results show that composite oxide layer of SiO2 and Fe is produced.

Figure 6:
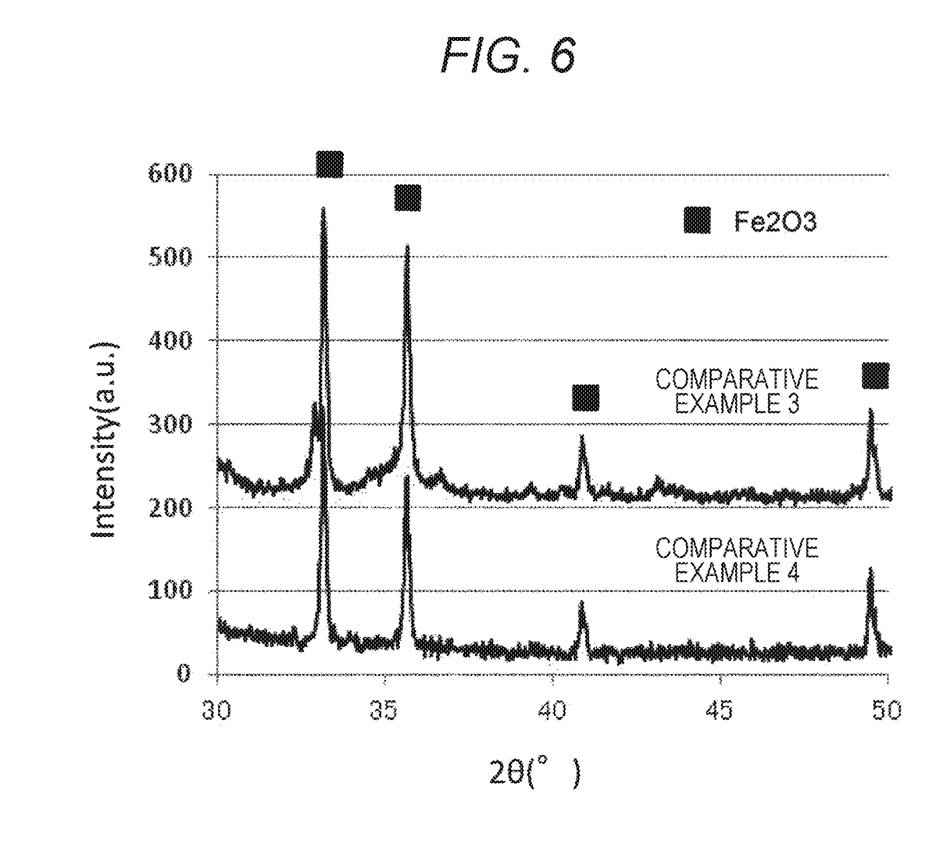
FIG. 6 illustrates XRD measurement results of negative electrode active material particles of Comparative Example 3 and Comparative Example 4 of the invention.

In contrast, FIG. 6 illustrates XRD measurement results of Comparative Example 3 and Comparative Example 4 as representative examples. In Comparative Example 3 and Comparative Example 4, even when Fe source is changed, only peaks of Fe2O3 appear, and no peak of composite oxide of SiO2 and Fe appears. Thus, it is understood that no composite oxide layer of Fe and SiO2 was made in the forming methods in the comparative examples.

Figure 9:
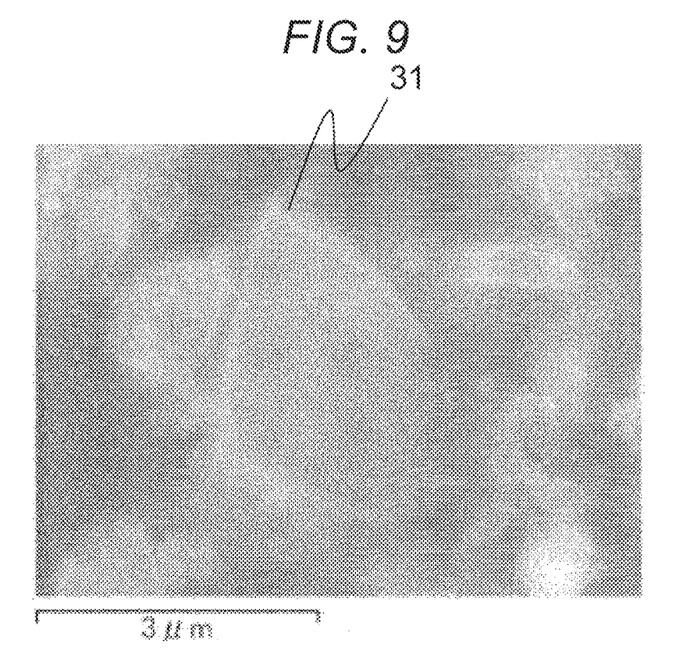
FIG. 9 is the negative electrode active material particles observed by a SEM in Example 1.
Figure 10:
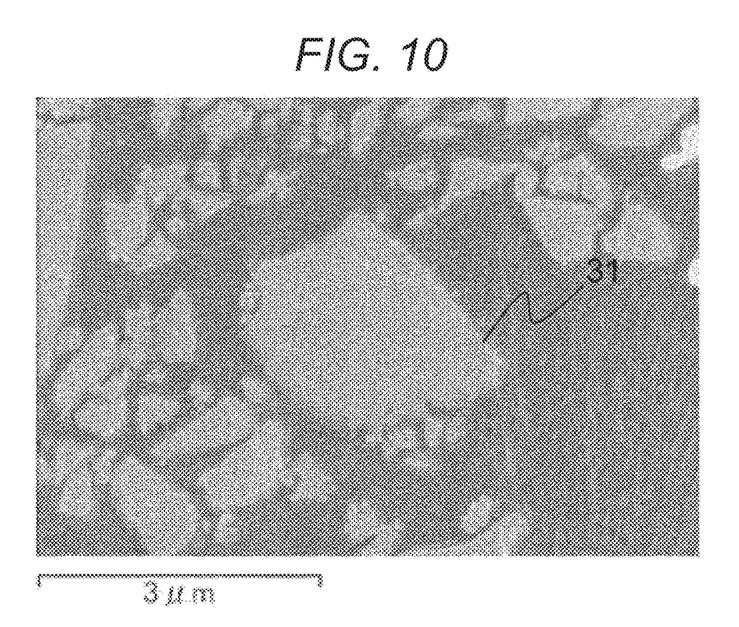
FIG. 10 is the negative electrode active material particles observed by a SEM in Example 2.

FIG. 9 and FIG. 10 each illustrate data of the particles observed by an SEM. In FIG. 9 and FIG. 10, to facilitate visualization of the composite oxide layer of Fe and SiO2, complex particles are solidified by carbonaceous material. This fails to see the carbon coating layer of the outermost periphery. FIG. 9 illustrates particles in Example 1, and FIG. 10 illustrates particles in Example 2. In both Example 1 and Example 2, a thin coating film (composite oxide layer of Fe and SiO2) can be seen on the surface of SiO, and the thickness of the coating film in Example 1 is larger than the thickness of the coating film in Example 2. In Example 2, ultrathin coating film is formed, and fine Fe is estimated to be dispersed in the composite oxide layer of Fe and SiO2.

Figure 8:
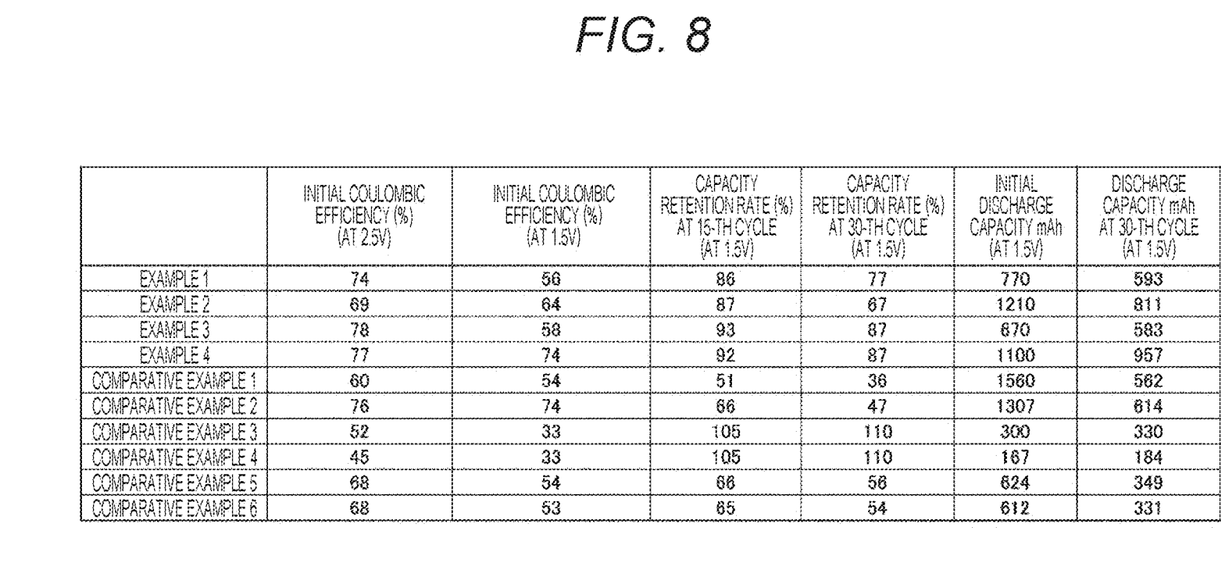
FIG. 8 is a diagram illustrating electrical characteristics in each of the examples and the comparative examples.

Subsequently, using the batteries obtained by Examples and Comparative Examples, in charging conditions, constant current charge was performed up to 0.01 V at the current value corresponding to 0.2 C, and thereafter constant voltage charge was performed till the current value became 1/100 C. Then, after the interruption of 5 min, discharge was performed at the current value corresponding to 0.2 C to 2.5 V. This cycle shall be one cycle and charge-discharge data was obtained. FIG. 8 summarizes data in the examples. Note that insertion of Li into active material is defined as charge and separation of Li from active material is defined as discharge.

In Example 1, the capacity retention rate when discharge was performed to 2.5 V is 77%, which is high, but the capacity retention rate when discharge was performed at 1.5 V is 56%, which is low. The reason why the capacity retention rate when discharge was performed at 1.5 V is low is that Li occluded in Fe oxide fails to discharge when the voltage is less than 2 V.

In Example 2, discharge capacity retention rate when discharge was performed to 2.5 V is lower than that in Example 1 and Comparative Example 2, and discharge capacity retention rate at 1.5 V is 60%, which is higher than that in Example 1. This is probably because amount of Li occluded in composite oxide during initial charge is reduced because the production of the composite oxide is smaller than that in Example 1, so that the capacity retention rate when discharge was performed at 1.5 V is high.

In Example 3, initial coulombic efficiencies and cycle characteristics are nearly equal to those in Example 1.

In Example 4, initial coulombic efficiencies and cycle characteristic are improved as compared with those in Example 1.

The results show that the data of examples is better than the data of the comparative examples in any items.

In Comparative Example 1, only initial charge-discharge capacity is large and the other items are low as compared with those in Example 1. This is probably because Fe2O3 and SiO do not form composite oxide, so that bonding between Fe2O3 particle and SiO particle is broken during charging-discharging.

In Comparative Example 2, initial coulombic efficiencies and cycle characteristics are higher than those in Comparative Example 1, but discharge capacity retention rate is lowered after initial few cycles, and the capacity retention rate after 30 cycles is 47%. This is probably because SiO of the surface is readily peeled off as compared with Example 1 due to expansion and contraction accompanying charge and discharge.

In Comparative Examples 3 and 4, the initial coulombic efficiencies were low as compared with those in Comparative Example 1. This is probably because Fe2O3 and SiO do not form composite oxide, so that bonding between Fe2O3 particle and SiO particle is broken during charging-discharging.

In Comparative Examples 5 and 6, although the initial coulombic efficiencies are increased due to carbon coating, the rest of the results are probably because Fe2O3 and SiO do not form composite oxide, so that bonding at particle interface is weak, and Fe2O3 has an expansion-contraction rate accompanying charge and discharge different from that of SiO, which makes Fe2O3 be isolated from SiO during repetition of charge and discharge, breaking carbon layer on the surface and conducting network of the electrode.

The above operational advantages of the invention will be summarized.

The lithium ion secondary battery of the invention houses an electrode group having a positive electrode and a negative electrode in a battery can and the negative electrode includes a negative electrode active material supported on a negative electrode foil, and the negative electrode active material includes cores having SiO as a main component, a composite oxide coating layer of Fe and SiO2 disposed on the periphery of each of the cores, and a carbon coating layer disposed on the periphery of the composite oxide coating layer of Fe and SiO2. Forming a compound with the surface SiO makes it possible to terminate the dangling-bonds of the surface SiO to reduce the irreversible capacity. Furthermore, binding strength between SiO and the composite oxide layer is increased, so that the surface coating layer becomes less likely to be peeled off. Consequently, the surface SiO becomes less likely to be exposed to electrolytic solution, making it possible to suppress creation of a decomposition product such as SEI due to reaction with electrolytic solution. Furthermore, since a composite oxide coating layer is provided between with the carbon coating layer, SiO of the core is prevented from being in contact directly with carbon material. This makes the composite oxide coating layer alleviate the stress due to expansion and contraction of SiO, forming the structure that makes the carbon material be less likely to be peeled off moreover.

Furthermore, in the lithium ion secondary battery of the invention, the mass of SiO is larger than the mass of Fe in the negative electrode active material. This makes it possible to terminate the dangling bonds on the surface SiO to reduce irreversible capacity without lowering the capacity of the battery too much.

Furthermore, the lithium ion secondary battery of the invention has a structure in which fine Fe metal is dispersed in the composite oxide coating layer as illustrated by XRD of Example 2. Fe metal have good affinity with carbon and composite oxide, so that the carbon layer is less likely to be peeled off even when the composite oxide layer is thin, resulting in good cycle characteristics.

Furthermore, in the lithium ion secondary battery of the invention, a thickness of the composite oxide coating layer of Fe and $SiO_2$ is not less than 5 nm and not more than 1 μm. This makes it possible to prevent the capacity of the battery from being lowered and to prevent the free potential of Li from the composite oxide from becoming higher than the release potential of Li from SiO.

Furthermore, a method of producing a negative electrode active material of the invention includes the steps of preparing a mixed powder by kneading SiO particles and Fe oxide particles having an average diameter smaller than an average diameter of the SiO particles, heating the mixed powder at a temperature from 800° C. to 1100° C. under an inert as atmosphere, and coating carbon on the mixed powder after the heating step. Specifically, the invention makes it possible to evenly distributing precursor of Fe on the periphery of SiO by using SiO particles and Fe oxide particles having an average diameter smaller than that of the SiO particles, making it possible to form a composite oxide coating layer of Fe and $SiO_2$ on the periphery of each of the cores of SiO with certainty.

REFERENCE SIGNS LIST

1 battery
2 shaft center
3 electrode group
4 battery can
5 insulating plate
6 battery lid
7, 8 conductive lead
9 gasket

The invention claimed is:

1. A lithium ion secondary battery in which an electrode group having a positive electrode and a negative electrode is housed in a battery can, wherein
    the negative electrode includes a negative electrode active material supported on a negative electrode foil, and
    the negative electrode active material includes a core having SiO as a main component, a composite oxide coating layer of Fe and $SiO_2$ disposed on a periphery of the core, and a carbon coating layer disposed on a periphery of the composite oxide coating layer of Fe and $SiO_2$; and
    a thickness of the oxide coating layer of Fe and $SiO_2$ is not less than 5 nm and not more than 1 μm.

2. The lithium ion secondary battery according to claim 1, wherein
    the mass of SiO is larger than the mass of Fe in the negative electrode active material.

* * * * *